March 29, 1966  C. R. PETERSON  3,242,666
SAFE PARACHUTE PACK OPENER WITH INDICATOR
Filed Dec. 26, 1963
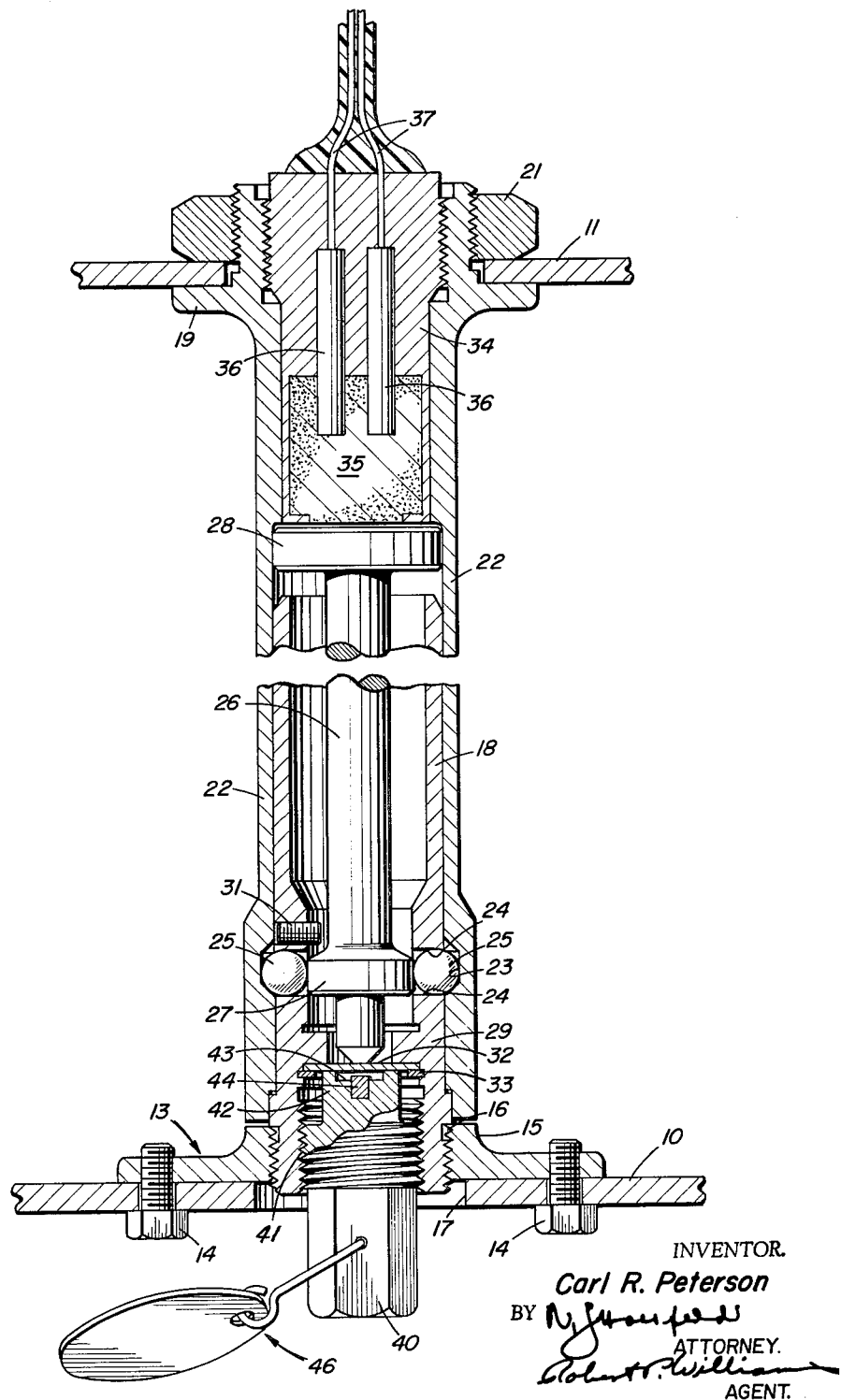
INVENTOR.
Carl R. Peterson
BY
ATTORNEY.
AGENT.

3,242,666
SAFE PARACHUTE PACK OPENER WITH
INDICATOR
Carl R. Peterson, Silver Spring, Md., assignor to the United States of America as represented by the Secretary of the Navy
Filed Dec. 26, 1963, Ser. No. 333,765
9 Claims. (Cl. 60—26.1)

The invention described herein may be manufactured and used by or for the Government of the United States of America for governmental purposes without the payment of any royalties thereon or therefor.

This invention relates to parachute pack opening mechanisms and particularly to an explosively releasable parachute pack opener provided with a novel protection or safety arrangement.

The present invention is an improvement over existing parachute pack opening mechanisms of the type shown, for example, in the patent to J. H. Potts, Jr., No. 3,087,697, issued April 30, 1963. Such a pack opener utilizes a ball lock mechanism to secure the pack cover in place and an electrically initiated explosive charge for performing the dual functions of releasing the ball lock mechanism and forcibly ejecting the pack cover to deploy the parachute with great force and speed. In the event of unintentional firing of the explosive charge, which could result, for example, from electromagnetic radiation or static electricity entering the initiation device, the untimely ejection of the pack cover is extremely dangerous to personnel and equipment. The device is especially dangerous while the weapon or other object with which the parachute is employed is being handled, such as while it is being loaded on or attached to an aircraft.

Accordingly, it is an object of the invention to provide an explosively operated parachute pack opening mechanism that is completely safe in that even if the explosive charge is inadvertently detonated at some unintended time, the lock does not open and the pack cover does not eject.

Another object is to provide a safety device for use with a ball lock mechanism, which device will prevent release of the ball lock until such time as it is desired to intentionally release the lock.

Still another object of the invention is to provide a safety device as described in the foregoing paragraph which incorporates an indicator to advise operating personnel whether or not the explosive charge has been prematurely detonated.

These objects are fulfilled by the preferred embodiment of the present invention as herein disclosed, in which a safety plug is positioned in the ball lock mechanism in close proximity to the end of the operating rod of the lock to prevent the same from moving to the released position. A malleable metal slug upstanding from the surface of the safety plug in the path of the operating rod, in position to be mashed flat if the rod moves, serves to indicate whether or not the explosive has detonated.

Other objects and advantages of the invention will become apparent from a consideration of the following detailed description when read in conjunction with the accompanying drawings, wherein:

The single figure is a cross-section through the safe ball lock mechanism of the invention, the safety plug being shown in place.

The purpose of the explosively operated ball lock mechanism is both to hold the parachute pack cover in place and, when actuated, to forcibly eject the pack cover to extract and deploy the parachute as fully described in the aforementioned Potts patent. For these purposes, the ball lock mechanism is shown in FIG. 1 as attached between a wall 10 of the article to be retarded by the parachute and a wall 11 of the parachute pack cover. Reference to the Potts patent will show the balance of the structure of the parachute pack.

A mounting plate 13 is secured to wall 10 in any convenient manner, as by bolts 14. Mounting plate 13 is provided with a central boss 15 having a threaded aperture 16 therein, which overlies an access aperture 17 in wall 10. Threadedly engaged in aperture 16 is a tubular stem 18 which constitutes a part of the ball lock mechanism.

Secured to the wall 11 of the parachute pack cover, as by a flange 19 and clamp nut 21, is another tubular element or sleeve 22, the inside diameter of which is just larger than the outside diameter of stem 18 so that the parts may be telescoped together. An annular groove 23 is provided on the inner wall of sleeve 22, which groove overlies a circumferentially arranged row of apertures 24 through stem 18, when the parts are fully telescoped. Apertures 24 each serve to retain a locking ball 25 which may be urged into engagement with groove 23 to lock the parts in telescoped relation.

An operating rod 26 is axially movable to a limited extent within the stem 18 and sleeve 22. Near its lower end, rod 26 is provided with an enlarged portion 27 of relatively short axial extent which may be aligned with balls 25 to urge them into locking position. At its upper end, rod 26 carries a piston 28 which is disposed above the end of stem 18 and which is closely fitted in sleeve 22. Operating rod 26 is retained in stem 18 prior to assembly of the parts by a reduced diameter portion 29 of stem 18 disposed below enlarged portion 27 of rod 26 and a set screw 31 disposed above enlarged portion 27. Reduced diameter portion 29 also serves as an abutment against which a deformable closure disc 32 is held by a retaining ring 33, the purpose of the closure disc being to prevent rod 26 from moving past the locked position when the parts are being assembled.

In order to release the ball lock mechanism and to forcibly eject the cover when the parachute is to be deployed, an explosive fitting 34 is inserted and threadedly secured in sleeve 22. Fitting 34 has a chamber 35 therein which is filled with an explosive material and which communicates with the space above piston 28. Detonators 36 are provided which communicate by means of leads 37 with a suitable firing device. In operation, the explosive is ignited and the resulting gas pressure forces rod 26 to deform disc 32 and thereby push it free of its engagement with retaining ring 33, moving rod 26 the predetermined distance required to remove enlarged portion 27 from locking position. Then, subsequent to the release of balls 25, the expanding gases react against piston 28 and fitting 34 to forcibly eject the pack cover.

In the event of premature unintentional detonation of fitting 34, the resulting ejection of the pack cover might, as stated above, injure personnel or equipment in the vicinity of the device. Accordingly, the invention contemplates the provision of a safety device which in the preferred form is a safety plug 40.

Stem 18 is internally threaded at its lower end for cooperation with threads 41 on plug 40. An unthreaded, reduced diameter portion 42 of plug 40 is disposed against disc 32 when plug 40 is fully inserted. The end of portion 42 which bears against disc 32 is provided with a cup-shaped depression 43 to effectively allow rod 26 to deform disc 32 and move a distance less than the aforementioned predetermined distance upon detonation of fitting 34, thus providing the desired result of preventing release of the ball lock.

Secured in any desired manner in the bottom wall of depression 43 is a malleable metal slug 44, which may conveniently be of copper, to serve as an indicator of whether or not the fitting 34 has been detonated while plug 40 has been in place. When plug 40 is removed to prepare the device for operation, slug 44 is inspected and if it has been mashed flat by the force of the explosion transmitted through rod 26, the indication is given to the inspector that the fitting has detonated.

An informative tag 46 may be attached to plug 40, if desired, to advise personnel to remove the safety plug when preparing the device for use.

Obviously many modifications of the invention may be made in the light of the above teachings and it is to be understood that within the scope of the appended claims, the invention may be practiced otherwise than as described.

What is claimed is:

1. A safe explosively releasable locking mechanism comprising:
   a ball lock mechanism having an operating rod movable from locking to unlocking position by means of an explosive charge adjacent one end thereof, and
   a safety plug removably secured in said mechanism closely adjacent the opposite end of said operating rod,
   whereby in the event of premature unintentional detonation of said explosive charge, said operating rod is prevented from moving to unlocking position.

2. A mechanism as recited in claim 1 wherein the end of said plug adjacent the end of said operating rod carries a malleable metal slug adapted to be deformed by the force of the unintentional explosion transmitted through said operating rod,
   whereby upon removal of said plug, inspection of said slug will indicate whether or not said explosive charge has prematurely fired.

3. A safe explosively releasable ball lock mechanism comprising:
   a hollow cylindrical stem having a plurality of circumferentially spaced apertures therein,
   a hollow cylindrical sleeve fitted about said stem for translatory movement thereon, said sleeve having an annular recess therein,
   a movable piston within said sleeve,
   a plunger secured to said piston and extending into said stem, said plunger having an enlarged portion thereon,
   a plurality of balls, each disposed within a respective aperture in said stem, the enlarged portion of said plunger being engageable with said balls to force them into engagement with the recess in said sleeve to lock said sleeve and said stem together,
   a chamber in said sleeve adjacent said piston, said chamber being adapted to hold an explosive charge which upon detonation can cause said piston to move and remove said enlarged portion from engagement with said balls to thereby release said sleeve from said stem, the expanding gases then forcing said sleeve off said stem, and
   a safety plug removably secured in said stem in axial alignment with and closely adjacent to the end of said plunger remote from said piston when said plunger is in the locked position,
   whereby in the event of premature detonation of said explosive charge, said plunger is prevented from moving to unlocked position.

4. A mechanism as recited in claim 3, wherein said stem is internally threaded adjacent the end of said plunger and said plug is threaded for cooperation with the threads in said stem.

5. A mechanism as recited in claim 3, wherein the end of said plug adjacent the end of said plunger carries a malleable metal slug adapted to be deformed by the force of the explosive charge transmitted through the plunger,
   whereby upon removal of said plug, inspection of said slug will indicate whether or not said explosive charge has prematurely fired.

6. A mechanism as recited in claim 3, wherein a predetermined displacement of said plunger is required to remove said enlarged portion from locking relation to said balls, and the distance between the end of said safety plug and the end of said plunger when in the locked position is less than said predetermined displacement.

7. A safety device for an explosively operated parachute pack opening mechanism in which the pack cover is normally held in place by a ball-lock mechanism having an operating rod movable axially by means of an explosive charge from a locked to an unlocked position, said safety device comprising,
   a plug adapted to be removably secured in said pack opening mechanism in axial alignment with and closely adjacent to the end of said plunger opposite from the actuating explosive charge,
   whereby in the event of premature detonation of said explosive charge, said plunger is prevented from moving to unlocked position.

8. A safety device as recited in claim 7, wherein the body of said pack opening mechanism is provided with an internally threaded opening adjacent the end of said plunger and said plug is a threaded plug adapted to be secured in said threaded opening.

9. A safety device as recited in claim 7, wherein the end of said plug adjacent the end of said plunger carries a malleable metal slug adapted to be deformed by the force of the explosive charge transmitted through the plunger,
   whereby upon removal of said plug, inspection of said slug will indicate whether or not said explosive charge has prematurely fired.

No references cited.

MARK NEWMAN, *Primary Examiner.*

R. M. WALKER, *Assistant Examiner.*